United States Patent [19]

Vaitekunas et al.

[11] Patent Number: 4,987,412

[45] Date of Patent: Jan. 22, 1991

[54] METHOD AND APPARATUS FOR THE SIMULTANEOUS DISPLAY AND CORRELATION OF INDEPENDENTLY GENERATED IMAGES

[75] Inventors: Jeffrey J. Vaitekunas, Chicago, Ill.; Ronald A. Roberts, Crown Point, Ind.

[73] Assignee: The United States of America as represented by the United States Department of Energy, Washington, D.C.

[21] Appl. No.: 236,582

[22] Filed: Aug. 25, 1988

[51] Int. Cl.$^5$ .............................................. G09G 5/08
[52] U.S. Cl. ...................................... 340/721; 340/706
[58] Field of Search ............... 340/721, 706, 709, 710, 340/724, 723; 364/518, 521

[56] References Cited

U.S. PATENT DOCUMENTS

| | | | |
|---|---|---|---|
| 4,364,056 | 12/1982 | Suzuki et al. | 346/29 |
| 4,545,067 | 10/1985 | Jurin et al. | 382/56 |
| 4,586,035 | 4/1986 | Baker et al. | 340/712 |
| 4,642,621 | 2/1987 | Nemoto et al. | 340/721 |
| 4,663,616 | 5/1987 | Christensen | 340/724 |
| 4,725,829 | 2/1988 | Murphy | 340/709 |
| 4,751,507 | 6/1988 | Hama et al. | 340/709 |

OTHER PUBLICATIONS

"Digital Image Processing", Castleman, Prentice Hall Inc., 1979, pp. 110 to 144 and 144 to 151.

Primary Examiner—Jeffery A. Brier
Attorney, Agent, or Firm—Bradley W. Smith; John M. Albrecht; William R. Moser

[57] ABSTRACT

An apparatus and method for location by location correlation of multiple images from Non-Destructive Evaluation (NDE) and other sources. Multiple images of a material specimen are displayed on one or more monitors of an interactive graphics system. Specimen landmarks are located in each image and mapping functions from a reference image to each other image are calcuated using the landmark locations. A location selected by positioning a cursor in the reference image is mapped to the other images and location identifiers are simultaneously displayed in those images. Movement of the cursor in the reference image causes simultaneous movement of the location identifiers in the other images to positions corresponding to the location of the reference image cursor.

8 Claims, 4 Drawing Sheets $$f_i(X) \approx f_i(0) + f_{i,j}(0) X_j + \ldots \quad \begin{array}{l} i=1,2 \\ j=1,2 \end{array}$$

$$f_1 \approx f_1(0) + f_{1,1}(0) x_1 + f_{1,2}(0) x_2 + \ldots$$

$$f_2 \approx f_2(0) + f_{2,1}(0) x_1 + f_{2,2}(0) x_2 + \ldots$$

$$\begin{vmatrix} Q1x & Q1y & 0 & 0 & 1 & 0 \\ 0 & 0 & Q1x & Q1y & 0 & 1 \\ Q2x & Q2y & 0 & 0 & 1 & 0 \\ 0 & 0 & Q2x & Q2y & 0 & 1 \\ Q3x & Q3y & 0 & 0 & 1 & 0 \\ 0 & 0 & Q3x & Q3y & 0 & 1 \end{vmatrix} \begin{vmatrix} a11 \\ a12 \\ a21 \\ a22 \\ c1 \\ c2 \end{vmatrix} = \begin{vmatrix} R1x \\ R1y \\ R2x \\ R2y \\ R3x \\ R3y \end{vmatrix}$$

METHOD AND APPARATUS FOR THE SIMULTANEOUS DISPLAY AND CORRELATION OF INDEPENDENTLY GENERATED IMAGES

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

The present invention relates generally to an apparatus and method for comparison and evaluation of images of a material test specimen from NonDestructive Evaluation (NDE) and other sources. More particularly, the present invention relates to a method and apparatus for displaying similar images of a specimen on an interactive graphics display system and accurately locating and displaying locations in images which correspond to a selected location in one of the images.

Reliability of structural components can be achieved by accurate prediction of susceptibility to failure. Nondestrucutive evaluation by a method which has been shown to detect flaws in the material of which a structural member is composed is an effective method for achieving reliability of the structural member. Several NDE methods can be used to identify flaws which may cause failures of structural materials. Identification of the NDE method which most reliably identifies flaws that lead to failure is an important step in the development and application of structural materials.

Several NDE methods are used to evaluate materials. These include ultrasonic scans, radiography, X and gamma ray Computerized Tomography (CT), and Nuclear Magnetic Resonance (NMR) or Magnetic Resonance Imaging (MRI). Each of these methods is primarily sensitive to a single material characteristic. X-ray CT is primarily sensitive to density variations, NMR to chemical variations, and ultrasound to mechanical properties. To determine which of these methods may be most useful for predicting failure of a particular material, accurate comparison of images from the various NDE methods at the location of failure of a specimen is required. Because this type of comparison must be performed for a number of specimen, efficiency as well as accuracy of the comparison is desirable.

An interactive graphics display system can be used to identify specific locations in images of NDE specimens through use of the "Image-Pro" version 1.06 software. The method by which locations are identified using this software is to display an image on which a location of interest can be identified, obtain the distances from the location to identifiable specimen landmarks such as corners, display another image on which the location is to be identified and obtain distances from the identifiable landmarks to trial points until the location of interest is identified with acceptable accuracy This method provides adequate correlation and is acceptable for applications that require few locations to be correlated in a small number of images. The single image display and the trial and error method of locating points are disadvantages for applications that require many locations to be identified.

Therefore, in view of the above, it is an object of the present invention to provide an apparatus and method to evaluate a plurality of images of a material test specimen including NDE images by providing simultaneous accurate location by location correlation of the images.

It is another object of the present invention to provide an apparatus and method to evaluate a plurality of images from various NDE and other sources of a material test specimen that is efficient to implement and will allow rapid visual interpretation of the images.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects in accordance with the purposes of the present invention, as embodied and broadly described herein, the apparatus and method of this invention is an interactive display system comprising a computer and display on which multiple images of a material test specimen are simultaneously displayed. Locations choosen in one image are accurately located and identified in the other images by the computer.

The method by which location by location correlation of the displayed NDE images is efficiently achieved comprises displaying images on the display, selecting a reference image on which locations of interest will be selected, locating a number of specimen landmark points on each image, calculating mapping functions from the reference image to the other images by the computer, locating points of interest on the reference image, calculating the corresponding locations in the other images from the mapping functions by the computer and displaying an identifier at those calculated locations.

The reference image may be selected when landmarks on the images are being located by defining the reference image to be at a certain position in the sequence of images as landmarks are located, for example the first image in which landmarks are located. Locations in the displayed images may be identified by generation of a small visible identifier such as a cursor at the location.

The apparatus by which comparison and evaluation of images from multiple NDE and other sources is achieved comprises an interactive graphics display system. The interactive graphics display system comprises one or more display monitors capable of display of multiple images and at least one cursor, a computer and a means for generating the monitor display and reporting the location on the display of at least one cursor, a cursor locator device capable of providing position data to the computer, and a device to communicate operator commands to the computer.

This method and apparatus reduces the problem of locating an arbitrary location in multiple images of the specimen to locating a small number of identifiable landmarks of the specimen in each image. After these landmarks are located, the method demonstrates a selected location of interest in the reference image in all displayed images.

BRIEF DESCRIPTION OF THE DRAWINGS

The accompanying drawings which are incorporated in and form a part of the specification, illustrate an embodiment of the present invention and, together with the description, serve to explain the principles of the invention. In the drawings.

DETAILED DESCRIPTION OF THE INVENTION

Figure 1:
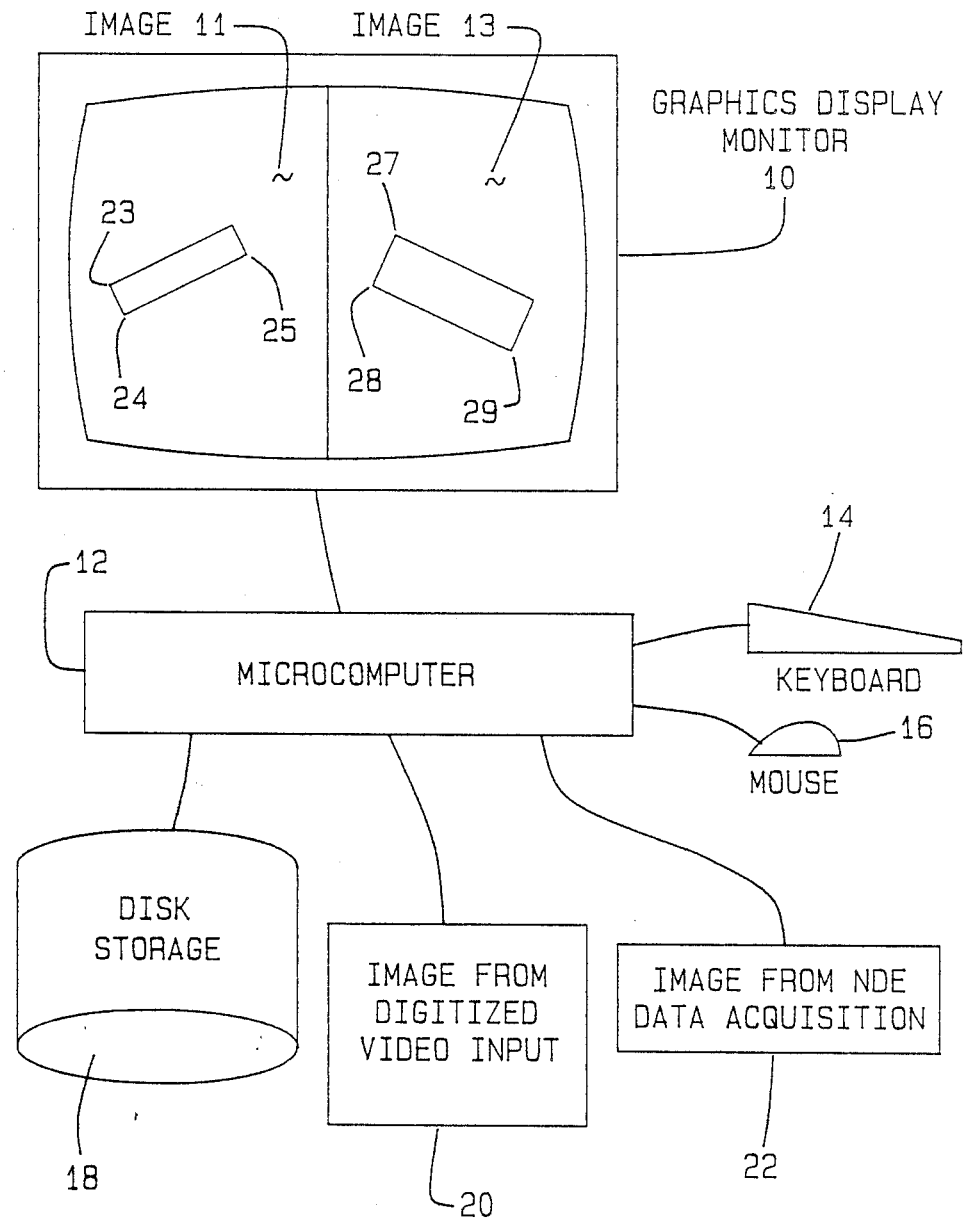
FIG. 1 is a diagram of an interactive graphics display system on which multiple image correlation is implemented.

To understand the present invention and its embodiments, the requirements that are necessary for meaningful practice of the invention in all embodiments should be recognized. Reference will now be made in detail to the present preferred embodiment of the invention, an example of which is illustrated in the accompanying drawings. FIG. 1 illustrates an interactive graphics display system comprising a bit mapped graphics display monitor, 10, controlled by a microcomputer 12 a mouse cursor locator device, 16, and a keyboard, 14, which comprise the preferred system for practicing the present invention. The source of the images are from NDE data acquisition apparatus that provide digital image data, 22, from digitized video images of NDE results, produced by means of a video camera which converts an optical image to an analog signal which is then processed by a video digitizer converting the analog signal to a digitized form 20, and/or from stored images, 18. The bit mapped display monitor is capable of displaying multiple images and one cursor. The computer which controls the display on the monitor is capable of generating a multiple image display on the monitor and accepts position information from a cursor locator device. Driver software for the particular display generation hardware used to drive the monitor is capable of generating a multiple image display, displaying one cursor and be capable of reporting the position of one cursor on the monitor. Driver software for the cursor locator device is capable of obtaining position data from the cursor locator device. The keyboard provides a means to provide input to the computer to specify input required to execute implementing software. The disk storage has sufficient capacity to store images to be displayed.

It will be understood by one skilled in the art that the functions performed by this apparatus may be performed by alternative means. As examples, multiple graphics display monitors each displaying one or more images may be used in place of the graphics display monitor. Each display monitor should provide sufficient image resolution to display detailed NDE results and be able to display one or more means for identifying locations on images such as a cursor. A host mainframe may be used in place of the microcomputer. A joystick, digitizer, or keyboard may be used in place of a mouse as a means for directing cursor movement. A locator device may be used to communicate operator commands through a command interface in place of a keyboard.

The preferred embodiment of the present invention by way of example comprises an interactive display system that creates a $1024 \times 1024 \times 8$ bit resolution image on a monitor. Images of $512 \times 483$ picture elements are displayed with sufficient resolution for accurate comparison of the images. Locations on the individual images are demonstrated with a cursor which was displayed on the images. The images each require approximately a quarter Megabyte for disk storage. The capacity of disk storage used in the present preferred embodiment of the invention is 20 Megabytes.

Figure 2A:
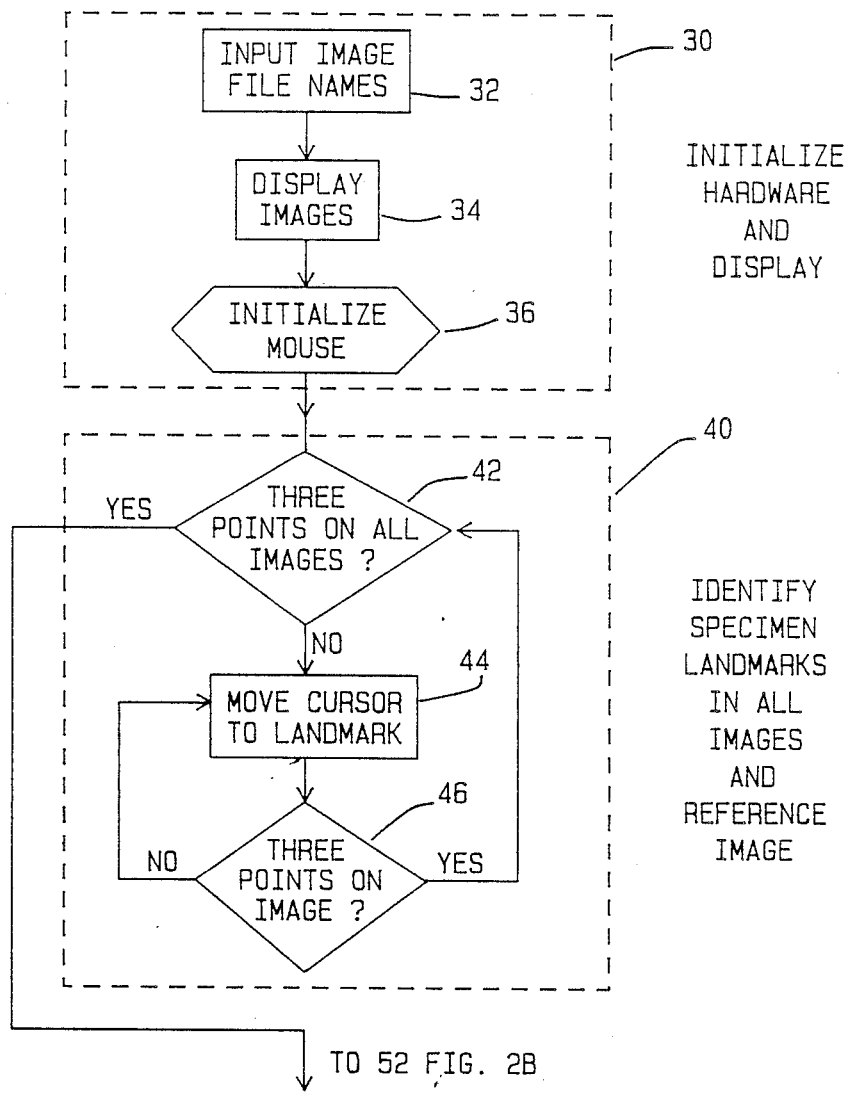
FIGS. 2A and 2B are a flow diagram of the method for correlating locations in multiple images.
Figure 2B:
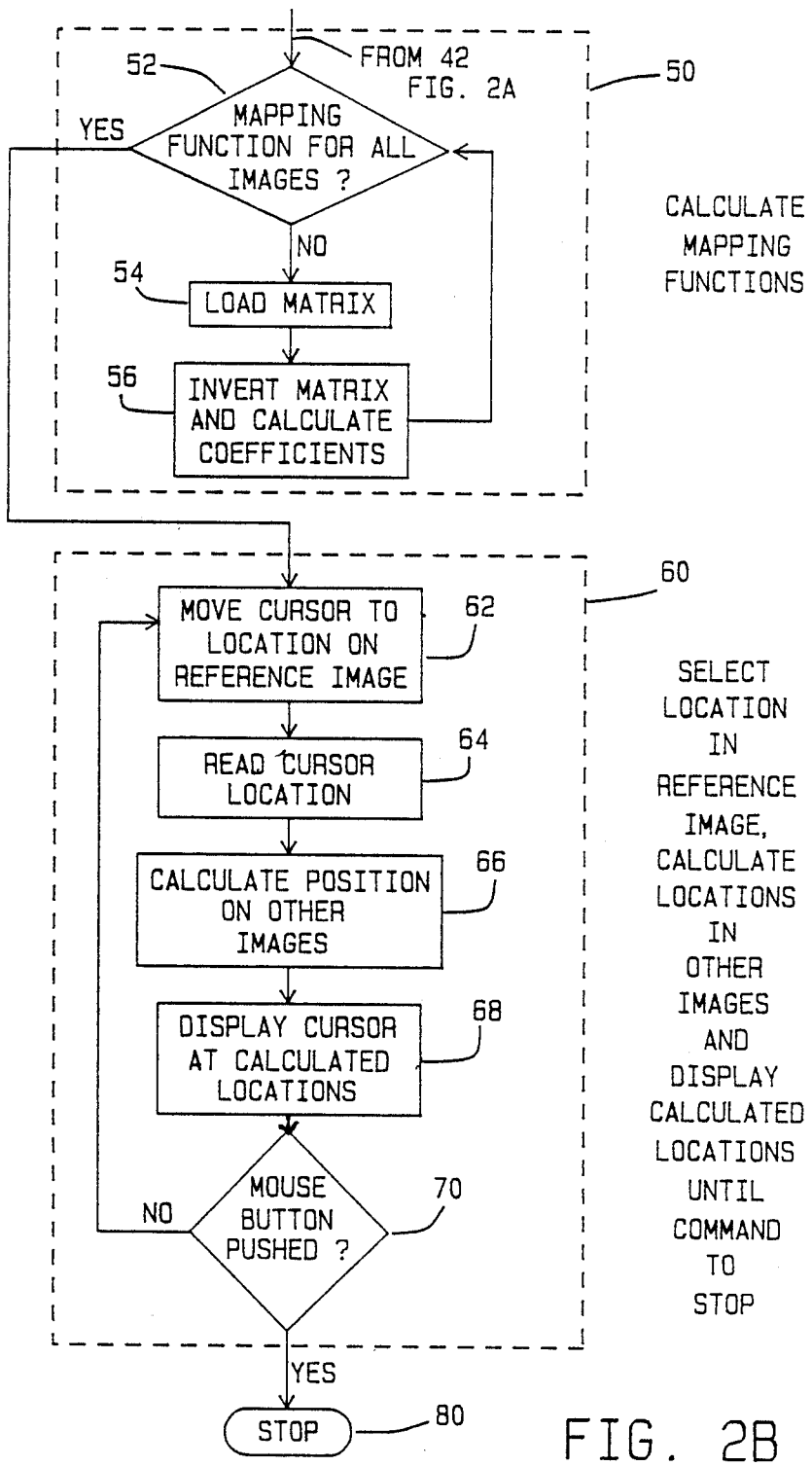

Referring to FIG. 2, the method of correlating locations in multiple images is illustrated by a flow diagram. A general description of the method is illustrated by the captions and sequence of the dotted line elements and the specific implementation of the preferred embodiment is illustrated by the steps of solid line elements of the flow diagram. The first general step of the method is to initialize the hardware and software of the graphics display system and display the images to be correlated, 30. The specific steps of the preferred implementation are to specify file names of the stored images to be displayed, 32, display the images, 34, and initialize the cursor locator mouse, 36.

The second step of the general method is to identify the specimen landmarks in each image that will be used to calculate the corresponding locations in images other than the reference image, 40. The mapping functions that are used in the preferred embodiment of the method require three landmarks. The landmarks are located in each image by moving a small arbitrary displayed image, cursor, to the location of the landmark and obtaining that location, 44, and repeating that operation three times for each image, 46, until landmarks are obtained for all images, 42. An example of an implementation of this step of the method can be seen from FIG. 1. Two images, 11 and 13, are displayed on the graphics display monitor, 10. A convenient set of landmarks can be chosen to be corners, 23, 24, and 27, 28, 29, of the images 11 and 13. The reference image can be selected to be either of the displayed images. The general method only requires that the reference image be identified. The reference image is selected in the preferred embodiment of the method as the first image for which landmarks are identified. The reference image could be defined to be the second, third, or any image in which landmarks are identified.

The third step of the general method is to calculate the mapping functions that will be used to locate points in images that correspond to selected points in the reference image, 50. The steps of the preferred embodiment will be described after the derivation of the preferred mappings functions is described.

The fourth step of the general method is the use of the graphics display system to select locations of interest in the reference image and identify the corresponding locations in the other images, 60. The referred embodiment of the invention implements this step by moving a cursor to a location of interest on the reference image, 62, reading the position of this cursor on the screen, 64, calculating the corresponding location in the other images using the mapping functions, 66, moving the cursor sequentially to the calculated images, 68, and determining whether to continue the process by determining whether a button on the cursor locator mouse has been pressed by the operator, 70. The cursor is moved from reference image to the calculated location in other images sufficiently rapidly that the display appears to contain multiple blinking cursors. As the mouse is used to change the position of the cursor in the reference image, the position of the cursor in the other images changes. As an example, if Image 11 of FIG. 1 is the reference image, moving a cursor from point 23 to point 25 would simultaneously move a cursor from point 27 to point 29 in Image 13. Execution of the program is terminated when the button on the mouse is pressed, 80.

Figure 3:
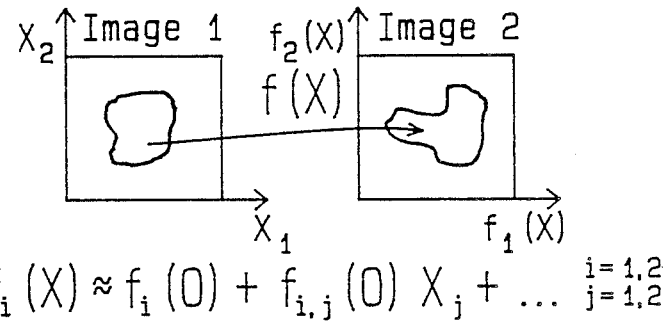
FIG. 3 is an illustration of the use of a mapping function to determine corresponding positions expressed as coordinates in two images and a mapping function in the form of a Taylor's series.

The mapping functions used for the present preferred embodiment of the invention is based on a Taylor's series derivation of the mapping function as illustrated in FIG. 3.

The general expression for the relationship between the coordinates of the system of Image 2, $f_1(x)$ and $f_2(x)$, and the coordinates of Image 1, $X_1$ and $X_2$, is written first in subscript notation and then explicitly in FIG. 3.

The coordinates of a point in Image 2, $f_1$ and $f_2$, which correspond to the coordinates of a point in Image 1, $X_1$ and $X_2$, can be calculated as indicated in FIG. 3, once the coefficients, $f_1(0)$, $f_2(0)$, $f_{1,1}(0)$, etc., are known. Terms greater than first order are neglected leaving six constant coefficients to be determined.

Figure 4:
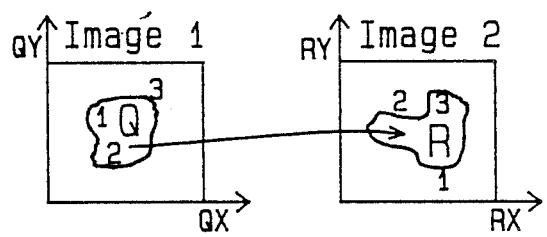
FIG. 4 is an illustration of the relationship between the corresponding locations of three points in two images and the relationship expressed as a matrix equation.

Referring to FIG. 4, shapes Q and R can be considered to be two images of the same specimen. Coordinates on the images are expressed in terms of coordinates Qx, Qy, Rx, and Ry. The relationship from FIG. 3 can be used to determine the coordinates in R that correspond to coordinates of a point in Q. The notation of FIG. 4 corresponds to that of FIG. 3 such that coefficients C1, C2, a11, a12, a21, a22 corresponds to $f_1(0)$, $f_2(0)$, $f_{1,1}(0)$, $f_{1,2}(0)$, $f_{2,1}(0)$, $f_{2,2}(0)$ respectively. The relationship between the coordinates of three points which are known to correspond in the two images can be written in the matrix form of FIG. 4. Creation of the square matrix of FIG. 4 is 54 of FIG. 2B. Coefficients C1, C2, a11, a12, a21, and a22 can be determined by calculating the inverse of the square matrix and premultiplying each side of the equation by that inverse matrix. This calculation is 56 of FIG. 2B The position on the image R in FIG. 4 which corresponds to a known point on the image Q can be calculated from the matrix equation:

$$\begin{vmatrix} Qx & Qy & 0 & 0 & 1 & 0 \\ 0 & 0 & Qx & Qy & 0 & 1 \end{vmatrix} \begin{vmatrix} a11 \\ a12 \\ a21 \\ a22 \\ c1 \\ c2 \end{vmatrix} = \begin{vmatrix} Rx \\ Ry \end{vmatrix}$$

This relationship is then used to calculate the location in an image, R, of a location in the reference image, Q, that is selected using the cursor and cursor locator device. This calculation occurs as 66 of FIG. 2B.

The method is then used to demonstrate locations in other images that correspond to locations selected in the reference image by using the cursor locator device to move the cursor to a position on the reference image box, calculating the position of the corresponding position in another image, moving the cursor to the calculated position.

The embodiments of this invention in which an exclusive property or privilege is claimed are defined as follows:

1. A method of visually demonstrating a location of an image of an object which corresponds to a selected location on another image of the object and simultaneously visually identifying those locations with sufficient accuracy to permit comparison of Nondestructive Evaluation results, said method comprising:
    (a) displaying a plurality of images of an object on a monitor of an interactive display system;
    (b) locating three or more landmarks on each displayed image of the object on the monitor;
    (c) selecting one image as the reference image;
    (d) calculating mapping functions from the selected reference image to each other displayed image using the landmark locations;
    (e) selecting a location of interest in the reference image;
    (f) identifying the location on each displayed image that corresponds to the selected location on the reference image; whereby locations that can be visually located on one image are visually demonstrated in other images that may contain Nondestructive Evaluation results to be correlated to the selected location.

2. The method of claim 1 wherein selecting the reference image is accomplished by locating the landmarks in the image to be the reference image at a predefined numerical position in the sequence of images during landmark location.

3. The method of claim 1 wherein said locations in each displayed image that correspond to the selected location on the reference image are identified by displaying a cursor at those locations.

4. The method of claim 1 wherein the step of displaying images includes the step acquiring said images from Nondestructive Evaluation data acquisition apparatus, from digitized video input of images, and/or from returning stored image for display.

5. An interactive display system including a monitor, computer means, for movement of a location identifier on the monitor and a means for input of commands to the computer, the improvement to enable said display system to correlate corresponding positions in multiple independently generated images on the same object further compromises:
    a means for display of at least two images or an object on the display means;
    a means for appearance of a location identifier on a predetermined displayed reference image;
    a means for correlating through employment of a mapping function a location identifier on each of the alternate displays to a corresponding position as depicted by said location identifier on the reference image;
    means for moving the location identifier on the reference image;
    means for correlating a response to a movement of the location identifier on the reference image to the respective movement of said location identifiers on the other alternate displayed images with the result that a change in the position of the location identifier on the reference image will result in a corresponding change in the alternate image location identifier producing the effect that one location identifier tracks the other with respect to their physical location on the displayed object; whereby images can be compared at specific locations and their relationship to each other or an image demonstrating failure location can be evaluated.

6. The interactive graphics display of system of claim 5 wherein said location identifier appearing on each image other than the reference image is the location identifier which appeared on the reference image moved rapidly from image to image appearing at the locations specified by said mapping function, or in the alternative, if the apparatus will support multiple location identifiers unique to each image these location identifiers will appear to track simultaneously controlled by said mapping function.

7. The interactive display system of claim 5 wherein said system includes a high capacity data storage system wherein information for the generation of the images by the computer is stored and supplied to the computer by said system.

8. The interactive display system of claim 5 wherein said system includes a Nondestructive Evaluation data acquisition apparatus which generates an information stream and a means for utilizing said information stream in a format including a direct input signal which requires no signal processing, a direct input signal which must be processed, and a visual information display which must be processed.

* * * * *